United States Patent [19]

Hartauer

[11] Patent Number: 5,631,198
[45] Date of Patent: May 20, 1997

[54] METHOD FOR MAKING A PIEZORESISTIVE PRESSURE SENSOR OF SEMICONDUCTOR MATERIAL EMPLOYING ANISOTROPIC ETCHING

[75] Inventor: Siegbert Hartauer, Landshut, Germany

[73] Assignee: Texas Instruments Deutschland GmbH, Germany

[21] Appl. No.: 590,984

[22] Filed: Jan. 24, 1996

Related U.S. Application Data

[62] Division of Ser. No. 416,548, Apr. 3, 1995, Pat. No. 5,514,898, which is a continuation of Ser. No. 210,758, Mar. 22, 1994, abandoned.

[30] Foreign Application Priority Data

Mar. 22, 1993 [DE] Germany .................... 43 09 207.1

[51] Int. Cl.⁶ .................................................. H01L 21/77
[52] U.S. Cl. .................................................. 438/53; 438/977
[58] Field of Search .................... 437/249, 228 SEN, 437/7, 921, 901, 974, 918; 148/DIG. 159, DIG. 135

[56] References Cited

U.S. PATENT DOCUMENTS

| | | | |
|---|---|---|---|
| 4,417,946 | 11/1983 | Bohlen et al. | 430/313 |
| 4,588,472 | 5/1986 | Shimizu | 257/419 |
| 4,618,397 | 10/1986 | Shimizu et al. | 437/7 |
| 4,977,101 | 12/1990 | Yoder et al. | 437/901 |
| 5,110,373 | 5/1992 | Mauger | 437/901 |
| 5,296,730 | 3/1994 | Takano et al. | 437/901 |
| 5,514,898 | 5/1996 | Hartauer | 257/417 |

FOREIGN PATENT DOCUMENTS 2211674  8/1990  Japan .................... 437/901

*Primary Examiner*—Michael Trinh
*Attorney, Agent, or Firm*—William B. Kempler; Richard L. Donaldson

[57] ABSTRACT

A semiconductor device comprises a piezoresistive pressure sensor (12), which has a membrane (14), which is constituted by a conducting epitaxy layer (16), which is applied to a conducting semiconductor substrate (18) of the opposite conductivity. On the outer surface (20) of the membrane facing away from the semiconductor substrate (18) at least one piezoresistor (22) is incorporated. Between the semiconductor substrate (18) and the epitaxy layer (16) an annularly structured intermediate layer (28) is incorporated, which defines a region (26'), adjoining the inner surface (24) of the membrane, of an opening (26) extending through the semiconductor substrate (18). This opening (26) is produced by anisotropic semiconductor etching, the intermediate layer (28) having a conductivity which is opposite to that of the semiconductor substrate so that this intermediate layer (28) functions as an etch stopping means and is not attacked by the etchant.

4 Claims, 2 Drawing Sheets

METHOD FOR MAKING A PIEZORESISTIVE PRESSURE SENSOR OF SEMICONDUCTOR MATERIAL EMPLOYING ANISOTROPIC ETCHING

This is a division of application Ser. No. 08/416,548 filed Apr. 3, 1995, issued as U.S. Pat. No. 5,514,898 on May 7, 1966, which is a continuation of application Ser. No. 08/210, 758 filed Mar. 22, 1994, now abandoned.

The invention relates to a method for making a semiconductor device comprising a piezoresistive pressure sensor, which has a membrane which is constituted by a conducting epitaxy layer which is applied to a semiconductor substrate of the opposite type of conductivity, at least one piezoresistor being incorporated on the external surface of the membrane turned away from the semiconductor substrate and the internal surface of the membrane being etched free through an opening penetrating the semiconductor substrate.

BACKGROUND OF THE INVENTION

In the case of such devices the piezoresistive pressure sensor is provided in order to obtain the maximum degree of integration on a semiconductor substrate. The piezoresistors serve as transducers, the piezoresistive effect being relied upon in order to obtain an electrical signal representative of the pressure present in a measuring system.

A condition for the desired linear pressure to voltage transfer function is not only a minimum flexure of the membrane, but furthermore more particularly an accurate positioning of the piezoresistors. The same should as far as possible be provided in regions, in which the membrane has its maximum stress field. The position of these regions on the outer side of the epitaxy layer is however dependent on the position of the part of the epitaxy layer constituting such membrane, such part being determined by the opening etched free from the rear side. What is controlling here is the region of the opening directly adjacent to the epitaxy layer, since it defines the edge of the membrane.

This opening region which is responsible for defining the membrane is however not dependent on the particularities of electrochemical anisotropic semiconductor etching, but furthermore and more particularly on the respective positioning of the rear side mask and the thickness of the semiconductor substrate. Since both the positioning of the rear side mask in relation to the front side of the semiconductor device and furthermore the thickness of the wafer are always subject to certain fluctuations, the desired linearity of the transfer function is not attained in every case; The reproducibility of linear piezoresistive pressure sensors is therefore impaired by certain production parameters.

On the other hand, one object of the invention is to provide such a further development of the semiconductor device of the type initially mentioned and of the method for the production thereof. In the latter sense, the simplest possible means for optimum reproducibility of the linear transfer function of the piezoresistive pressure sensor which may be obtained practically independently from the respective positioning of the rear side mask is employed.

SUMMARY OF THE INVENTION

In order to attain this object in the semiconductor device in accordance with the invention, an annularly structured conducting intermediate layer which has a conductivity opposite to that of the semiconductor substrate is introduced, between the semiconductor substrate and the epitaxy layer. The intermediate layer is the region, adjoining the inner surface of the membrane, about the opening penetrating the semiconductor substrate.

Owing to this design the part, which forms the membrane, of the epitaxy layer is definitively set by the annularly structured, intermediate layer, which is incorporated between the semiconductor substrate and the epitaxy layer. Since this intermediate layer has a conductivity, which is opposite to that of the semiconductor substrate, it is possible for this intermediate layer to serve as an etch stopper for the electrochemical anisotropic semiconductor etching so that any departures in the positioning of the rear side mask from a desired position and any fluctuations in thickness of the substrate fail to have any effect on the critical opening part, which sets the limits of the membrane. Since the membrane limits as determined by the rear opening are always exactly reproducible, it is also possible to position the piezoresistors on the front side with the necessary accuracy in relation to the edge of the membrane, that is to say more particularly at a position, at which the membrane has its maximum stress field. The relative positioning of the piezoresistors is consequently practically only dependent on the accuracy of adjustment of the planar technology which is employed to produce each respective layer structure of the semiconductor device.

Such a respective membrane preferably has a plurality of monocrystalline piezoresistors associated with it, which for example are able to be connected with one another in a resistor bridge. Such piezoresistors, which are preferably provided on the flexure-sensitive points of the membrane, may with advantage be constituted by a respective zone, which is doped with impurity atoms, in the membrane consisting of monocrystalline semiconductor material.

It is furthermore an advantage that the semiconductor substrate and the piezoresistor pressure sensor may be integral components of a semiconductor crystal structured to be IC-compatible monocrystalline, which for example may have a bipolar and/or CMOS structure.

In the case of one practical working embodiment of the semiconductor device in accordance with the invention a P-substrate is provided, in which an $N^+$-zone is incorporated as an intermediate layer. In this case the epitaxy layer is an N-epitaxy layer.

The method in accordance with the invention relates to the production of the semiconductor device, in which case on one side of a conducting, monocrystalline semiconductor substrate a conductive prodoped epitaxy layer is applied, whose conductivity is opposite to that of the semiconductor substrate, on the outer surface of the epitaxy layer at least one piezoresistor is incorporated and on the opposite rear side of the semiconductor substrate a mask is applied having a window, through which by electrochemical anisotropic semiconductor etching an opening, which penetrates the semiconductor substrate, is produced, through which a part of the epitaxy layer is exposed in order to form a membrane associated with the pressure sensor. This method is characterized in that prior to the application of the epitaxy layer, an annularly structured, conductive doped zone is incorporated in the semiconductor substrate, and has a conductivity opposite to that of the semiconductor substrate. This zone as located between the semiconductor substrate and the epitaxy layer is employed as an etch stopper during anisotropic etching. Thus, this zone or region defines the limits of the opening, penetrating the semiconductor substrate, since the zone adjoins the inner surface of the epitaxy layer bounding the opening.

As a semiconductor material it is preferred to employ silicon, in this case the opening being produced by electrochemical anisotropic silicon etching. In this respect it is possible, for example, to use a [100] silicon substrate as a starting material, the high etch selectivity of etchant solutions with respect to the [111] crystal planes being taken advantage of.

Further advantageous developments of the semiconductor device in accordance with the invention and also of the method in accordance with the invention are set forth in the description which follows.

BRIEF DESCRIPTION OF THE DRAWINGS

The invention will now be described in following with reference to one working embodiment as illustrated in the drawings.

DESCRIPTION OF PREFERRED EMBODIMENT

Figure 1:
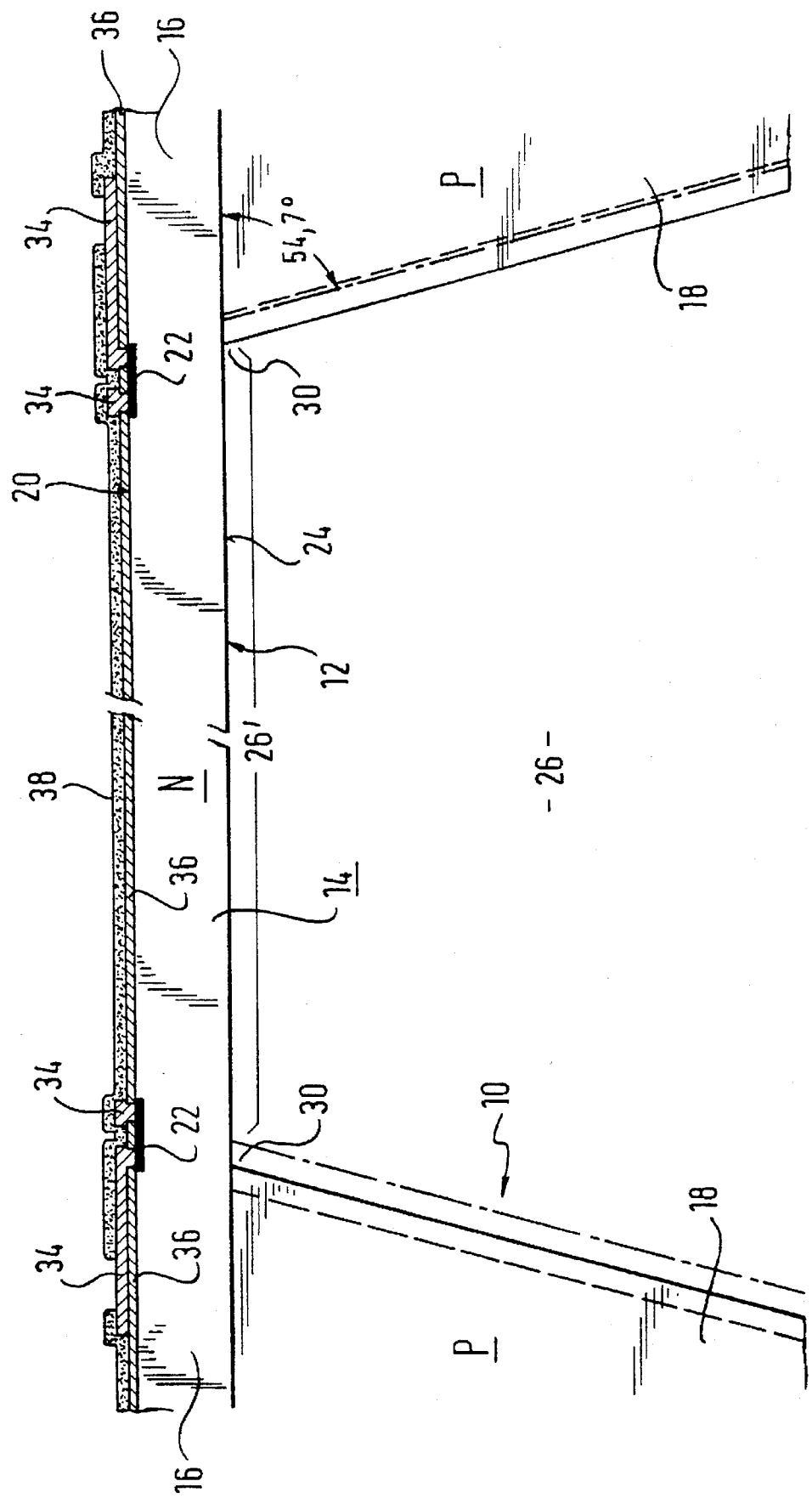
FIG. 1 is a diagrammatic, sectioned elevation of a conventional semiconductor device having an integrated piezoresistive pressure sensor.

In FIG. 1, there is shown a purely diagrammatic representation of the basic structure of a conventional semiconductor device formed by a monocrystalline silicon semiconductor crystal 10, which comprises an integrated piezoresistive pressure sensor 12.

The piezoresistive pressure sensor 12 comprises a membrane 14 which is exposed to the respective pressure to be measured and which is constituted by a part of an N-epitaxy layer 16, which is applied to a P-semiconductor substrate 18 of monocrystalline [100] silicon.

The outer surface 20, which faces away from the P-semiconductor substrate 18, of the membrane 14 constituted by the N-epitaxy layer 16 has piezoresistors 22 incorporated in it, which, in order to obtain a linear pressure/electrical voltage, are arranged in regions of the membrane 14, in which there is a maximum stress field. The part, which defines the membrane 14, of the N-epitaxy layer 16 is etched free through an opening 26 penetrating the P-semiconductor substrate 18, which opening has been produced from the rear side, which faces away from the N-epitaxy layer 16, of the P-semiconductor substrate 18 by electrochemical anisotropic silicon etching. In this respect the lateral edges of the opening 26 are determined by a respective [111] crystal plane, with respect to which the etchant solutions utilized have a high etch selectivity.

The region 26' directly adjoining the inner surface 24 of the membrane and hence determining both the dimensions and also the position of the membrane 14, of the opening 26 has, owing to the particular features of electrochemical anisotropic silicon etching, a diameter, which is smaller than the diameter of the opening 26 on the rear side, which faces away from the pressure sensor 12, of the P-semiconductor substrate 18.

The piezoresistors 22 are connected by metal conductors 34, which are applied to a silicon oxide layer 36 and serve to provide a connection of the piezoresistors 22 and/or as terminals. On top of the metal conductors 34 and the silicon oxide layer 36 a protective layer 38 is applied, which may be partly opened, more particularly for exposing connection surfaces.

In the case of such a structure the edge 30 of the membrane and, respectively, the lengths of the membrane edges are determined by the region 26', which is directly adjacent to the N-epitaxy layer 16, of the opening 26. Owing to the etch selectivity with respect to the [111] crystal plane, the opening 26 has a cross section which tapers cortically towards the N-epitaxy layer 16 with the result that the respective thickness of the substrate has a direct effect on the diameter of the opening region 26' adjoining the N-epitaxy layer 16.

Moreover the position of this opening region 26', which is controlling for the membrane 14, is dependent on the respective positioning of the rear side mask. Anisotropic silicon etching is applied to the rear side of the P-type substrate 18, which faces away from the N-epitaxy layer 16, in producing the possible opening 26 penetrating the substrate 18. Thus it is possible for the desired linearity of the pressure/voltage transfer to be impaired in an undesired manner furthermore by an inaccurate adjustment of the rear side mask in relation to the front side bearing the piezoresistors 22, of the semiconductor device. The reproducibility of predetermined lengths of the membrane edge and a predetermined positioning of the piezoresistors 22, for example, in relation to the edge of the membrane, is consequently clearly limited.

Thus, for example, [100] silicon wafers polished on either side are available in a range of ±15 µm so that there is a variation on the length of the membrane edge of ±20 µm.

Furthermore the rear side mask necessary for structuring the membrane can only be positioned in relation to the front side of the semiconductor device with an accuracy of ±10 µm. In the case of membrane lengths of 0.8 µm this in itself would lead to a nonlinearity of 1%.

The interdependence between the membrane edge length and membrane position on the one hand and the thickness of the wafer and the position of the mask on the other hand is purely diagrammatically indicated in FIG. 1 by lines delimiting the opening 26. In this respect the full lines indicate the opening 26 which both as regards their position in relation to the front side of the semiconductor device and the hence the piezoresistors 22 and furthermore as regards their cross section is the same as the predetermined desired values.

On the other hand, in the case of a thinner P-semiconductor substrate 18 the departure indicated by broken lines may arise, in accordance with which the diameter of the opening region 26' determining the membrane 14 is enlarged. As a result the piezoresistors 22 provided on the front side are then more remote from the respective edges of the membrane. On the other hand, in the case of a thicker P-substrate 18 there will be a smaller diameter of the opening region 26' (not illustrated).

The chained lines are employed to diagrammatically indicate the lateral displacement of the opening 26 which may occur in the case of a wrong placement of the rear side mask. Such a displacement leads as a result to an asymmetrical arrangement of the piezoresistors 22 in relation to the membrane 14 defined by the opening region 26', something that also may be responsible for a loss in the desired linearity and for a reduction in sensitivity.

Figure 2:
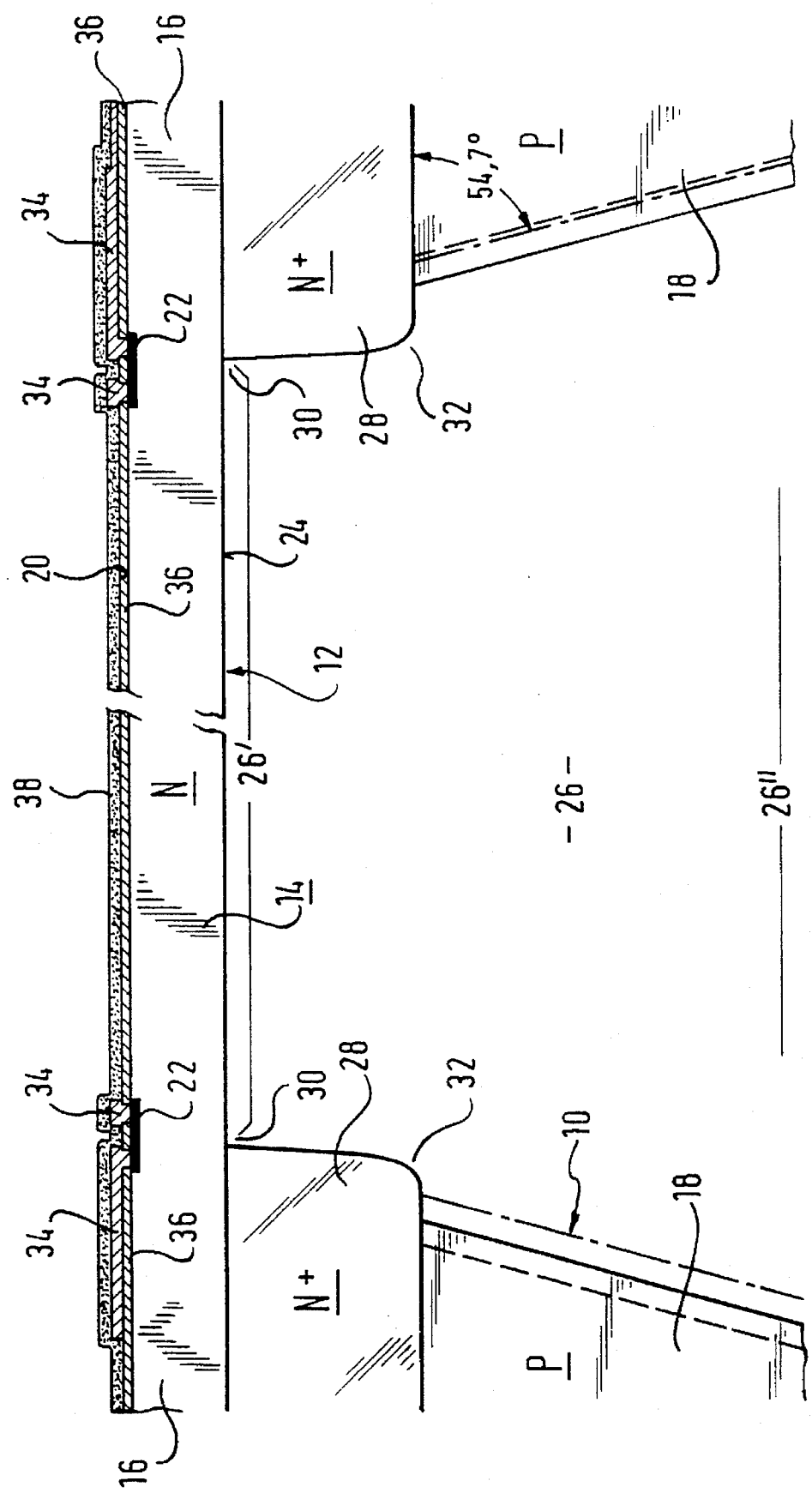
FIG. 2 is a diagrammatic, sectioned elevation of a semiconductor device having a piezoresistive pressure sensor with the intermediate layer functioning as an etch stopper.

FIG. 2 shows in a diagrammatic, sectioned representation a semiconductor device, which in principle has the same basic structure as that in accordance with FIG. 1, but in the case of which in addition an annularly structured $N^+$-intermediate layer 28 is incorporated between the P-semiconductor substrate 18 and the N-epitaxy layer 16, which determines the region 26' of the opening 26 which adjoins the inner surface of the membrane 24.

Since this $N^+$-intermediate layer 28 has a conductivity, which is opposite to that of the P-semiconductor substrate 18, it may be employed during the electrochemical anisotropic semiconductor etching performed from the rear side as an etch stopper, which is not attacked by the respective etchant and for this reason remains as a base defining the limits of membrane after the etching operation.

As a starting material [100] silicon was again utilized, the high selectivity of the etch solution in relation to the [111] crystal planes being taken advantage of.

The semiconductor device is again constituted by a monocrystalline silicon semiconductor crystal 10, which comprises a pressure sensor 12, whose membrane 14 is constituted by the part of an N-epitaxy layer 16, whose inner surface 24 is etched free through an opening 26, which penetrates through the P-semiconductor 18 bearing the N-epitaxy layer 16 and consisting of monocrystalline [100] silicon.

Unlike the semiconductor device depicted in FIG. 1, the opening region 26' relevant for the determination of the membrane 14 is exclusively set by the additional $N^+$-intermediate layer 28 incorporated between the P-semiconductor 18 and the N-epitaxy layer 16. The condition for this is only that the window opened up in the rear mask be sufficiently large for the opening region 26, including the edge surrounding the opening region 26 and constituted by the $N^+$-intermediate layer 28, to be within the edge formed by the $N^+$-intermediate layer in the case of there being an offset of the rear side mask from the desired position thereof.

The region of the opening 26 underlying the $N^+$-intermediate layer 28 is delimited by the region, which remains after etching, of the P-semiconductor 18, the position and the dimensions of the opening 26 (again indicated in full lines) resulting when the rear side mask is positioned in its desired position, that is to say positioned exactly. The widening of the cross section of the opening, which arises in the case of the maximum possible thickness of the P-semiconductor substrate 18, underneath the $N^+$-intermediate layer 28 is again indicated in chained lines. The maximum possible displacement of the rear side mask out of its desired or theoretical position will lead to a displacement of the opening region 26" underneath the intermediate layer 28, as is indicated in chained lines. Because of the etch selectivity in relation to the [111] crystal planes in the present case the edge of the region 26", which is underneath the $N^+$-intermediate layer 28, of the opening 26 will be at an angle of 54.7° to the inner surface of the intermediate layer 28 and, respectively, to the inner surface 24, which is parallel to it, of the membrane 14.

As shown in FIG. 2 the opening region 26 which is controlling for the edge length or, respectively, edge 30 of the membrane 14, and which is directly adjacent to N-epitaxy layer 16, is in all cases set by the $N^+$-intermediate layer 28. Even in the case of major departures from the respective desired values, it is hence possible to obtain a membrane 14, whose, dimensions and whose length in relation to the piezoresistors 22 are exactly in accordance with the preset values.

Between the P-semiconductor substrate 18 and the $N^+$-intermediate layer the opening 26 has a step 32, at which the opening cross section decreases with the transition from the semiconductor substrate 18 to the intermediate layer 28. This may, for example, be achieved by having a correspondingly large size of the window, which is provided in the rear side mask, in relation to the diameter of the opening region 26'. While the edge of the lower opening region 26" delimited by the P-substrate 18 is at an angle of approximately 54.7° to the lower or, respectively, inner surface of the intermediate layer 28, the edge, defined by the $N^+$-intermediate layer 28, of the opening region 26' controlling for the membrane 14, is at least substantially perpendicular to the inner surface 24 of the membrane 14 or, respectively, of the N-epitaxy layer 16 constituting the same.

In the illustrated working embodiment of the invention, the $N^+$-intermediate layer 28 is approximately two times or three times thicker than the membrane 14.

In other respects the semiconductor device depicted in FIG. 2 has a structure essentially similar to that of FIG. 1.

Thus again preferably a plurality of piezoresistors 22 are incorporated in the outer surface 20 of the membrane, which may be connected together in a resistance bridge. These electrically contacted piezoresistors 22 are arranged in the marginal region of the membrane 14, that is to say at those positions, at which the stress field of the membrane 22 is at maximum. The electrically contacted piezoresistors 22 are connected with metallic conductors 34, which are arranged on a silicon oxide layer 36 produced by thermal oxidation and serve for connection of the piezoresistors 22 with one another and/or for connection, for instance, with an electronic processing circuit and/or for the formation of terminal surfaces. As the uppermost layer there is again a protective layer 38, which may be opened adjacent to the terminal surfaces.

The semiconductor crystal 10 consisting of monocrystalline silicon and comprising the pressure sensor 12, may have a bipolar and/or CMOS structure. In the illustrated working embodiment of the invention the $N^+$-intermediate layer 28 is a doped zone of a conductivity opposite from that of the substrate 18 which is incorporated in the P-semiconductor substrate 18 by diffusion or ion implantation.

For the production of the working embodiment, depicted in FIG. 2, of a semiconductor device comprising a piezoresistive pressure sensor 12, the first step is to incorporate a doped zone with a ring-like structure by diffusion or ion implantation in order to form the $N^+$-intermediate layer 28. After this the N-epitaxy layer 16 is applied, on which by thermal oxidation a silicon oxide layer 36 is formed. Using masking and etching steps windows are produced in this silicon oxide layer 36 for the piezoresistors 22, which are incorporated in the form of P-doped zones in the N-epitaxy layer 16. These piezoresistors 22 may be basically also produced by ion implantation. After this the piezoresistors 22 are electrically contacted, whereafter, for example by electrolysis a metal layer is applied, from which by masking and etching steps the printed wiring or, respectively, metal conductors 34 are formed.

In this respect it is possible for the piezoresistors 22, which are associated with a respective membrane 14, to be connected together in a bridge or the like.

After this, for example by a chemical vapor deposition process, the protective layer 38 is applied, in which windows may again be opened, by masking and etching operations, for instance over terminal surfaces.

After application of the N-epitaxy layer 16 it is possible to incorporate any desired transistor structures, for example for an integrated processing circuit or the like.

After this a mask with a window is applied to the rear side of the semiconductor substrate 10 in order by electrochemical anisotropic semiconductor etching to produce the opening 26 through the monocrystalline P-semiconductor substrate 18. For the anisotropic silicon etching caustic potash (KOH) or a similar etchant may be employed as an electrolyte or etching solution.

Prior to proceeding with the electrochemical anisotropic silicon etching from the rear side, it is preferred to make certain that both the N-epitaxy layer 16 and also the $N^+$-intermediate layer 28 possess a sufficiently anodic potential.

The next step is that of etching through the monocrystalline P-semiconductor substrate 18 of [100] silicon as far as the $N^+$-intermediate layer 28 from the rear side in order to form the opening 26. In this respect both the P/N junction between the P-semiconductor substrate 18 and the N-epitaxy layer 16 and furthermore the P/N junction between the semiconductor substrate 18 and the $N^+$-intermediate layer 28 serve as an etch stopping means so that the opening region 26' which sets the membrane 14 is immediately adjacent to the N-epitaxy layer 16 is always defined by the $N^+$-intermediate layer 28 which functions as a base and is not attacked by the etching solution.

The piezoresistors 22 are accordingly always aligned in relation to the edge 30 of the membrane (in whose zone the maximum stress fields lie) with the degree of accuracy to be expected of planar technology and independently of the respective thickness of the P-substrate 18 and the positioning of the rear side mask.

The thickness of the $N^+$-intermediate layer 28 functioning as a base and membrane edge stiffening means is preferably selected to be two to three times greater than the thickness of the membrane 14.

Thus a semiconductor device is created, in the case of which the presence of an additional, annularly structured intermediate layer 28 means that there is a well adjusted and structured step, on which the maximum stress field will be localized, which is employed for evaluating the pressure. The relative positioning of the piezoresistors is accordingly practically independent of the thickness of the substrate and the respective positioning of the rear side mask. This positioning may take place with the accuracy possible in planar technology.

What is claimed is:

1. A method for making a semiconductor device in the form of a piezoresistive pressure sensor, said method comprising:

providing a substrate of semiconductor material of one conductivity type;

depositing dopant material of the other conductivity type opposite from the one conductivity type of said substrate in the semiconductor substrate to define an annular doped zone of the other conductivity type in the semiconductor substrate;

providing an epitaxial layer of semiconductor material of the other conductivity type opposite from the one conductivity type of said substrate on one surface of the semiconductor substrate and adjacent to the annular doped zone of the other conductivity type;

providing at least one piezoresistor on the outer surface of the epitaxial layer of semiconductor material of the other conductivity type;

providing a mask having an opening therethrough on a surface of the semiconductor substrate opposite from the one surface of the semiconductor substrate;

patterning the semiconductor substrate in accordance with the mask by electrochemical anisotropic semiconductor etching through the opening in the mask to define an opening penetrating the semiconductor substrate and exposing a portion of the epitaxial layer of the other conductivity type to define a membrane by the portion of the epitaxial layer exposed by the opening penetrating the semiconductor substrate; and determining the periphery of the membrane defined by the exposed portion of the epitaxial layer of the other conductivity type during the electrochemical anisotropic semiconductor etching via the annular doped zone of the other conductivity type in the semiconductor substrate which serves as an etching stopper.

2. A method of making a semiconductor device in the form of a piezoresistive pressure sensor as set forth in claim 1, wherein the semiconductor material of the substrate and the epitaxial layer is silicon; and the electrochemical anisotropic semiconductor etching of the opening penetrating the semiconductor substrate is electrochemical anisotropic silicon etching.

3. A method for making a semiconductor device in the form of a piezoresistive pressure sensor as set forth in claim 1, wherein said at least one piezoresistor is incorporated on the outer surface of the epitaxial layer of semiconductor material of the other conductivity type by providing dopant material of said one conductivity type in the epitaxial layer of semiconductor material of the other conductivity type to define at least one doped zone of said one conductivity type serving as said at least one piezoresistor.

4. A method for making a semiconductor device in the form of a piezoresistive pressure sensor as set forth in claim 1, wherein said at least one piezoresistor is provided at a predetermined location on the outer surface of the epitaxial layer of semiconductor material of the other conductivity type in relation to the annular doped zone of the other conductivity type in the semiconductor substrate; and thereafter accurately establishing the location of said at least one piezoresistor in relation to a peripheral edge of the membrane by the determination of the periphery of the membrane defined by the exposed portion of the epitaxial layer of the other conductivity type during the electrochemical anisotropic semiconductor etching via the annular doped zone of the other conductivity type in the semiconductor substrate.

* * * * *